(12) United States Patent
Yen

(10) Patent No.: US 7,168,194 B2
(45) Date of Patent: Jan. 30, 2007

(54) LICENSE PLATE FRAME

(75) Inventor: Tieh-Lin Yen, Dong Guan (CN)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 10/859,787

(22) Filed: Jun. 3, 2004

(65) Prior Publication Data
US 2004/0244240 A1 Dec. 9, 2004

Related U.S. Application Data

(60) Provisional application No. 60/475,760, filed on Jun. 4, 2003.

(51) Int. Cl.
G09F 7/00 (2006.01)
(52) U.S. Cl. .................. 40/209; D12/193
(58) Field of Classification Search ............ 40/209, 40/700, 798; D12/193
See application file for complete search history.

(56) References Cited

U.S. PATENT DOCUMENTS

| 5,383,294 | A | * | 1/1995 | Shen | 40/209 |
| 5,428,911 | A | * | 7/1995 | Figone et al. | 40/209 |
| D366,236 | S | * | 1/1996 | Chu | D12/193 |
| D382,241 | S | * | 8/1997 | Moureaux | D12/193 |
| D424,003 | S | * | 5/2000 | Steinhagen | D12/193 |
| D428,374 | S | * | 7/2000 | Steinhagen | D12/193 |
| D428,843 | S | * | 8/2000 | Steinhagen | D12/193 |
| D446,759 | S | * | 8/2001 | Leu | D12/193 |
| D469,044 | S | * | 1/2003 | Ohm et al. | D12/193 |
| 6,553,695 | B1 | * | 4/2003 | Wang | 40/209 |
| 2004/0148826 | A1 | * | 8/2004 | MacNeil | 40/209 |

* cited by examiner

Primary Examiner—Gary C. Hoge

(57) ABSTRACT

A license plate frame having a polymeric decorative component including three-dimensional and/or multi-colored decorative elements. The license plate frame may optionally include a stabilizer component of a rigid or semi-rigid plastic onto which the decorative component may be attached.

6 Claims, 2 Drawing Sheets

LICENSE PLATE FRAME

CROSS REFERENCE TO RELATED APPLICATIONS

The present application claims the benefit of pending U.S. Provisional Patent Application Ser. No. 60/475,760, filed Jun. 4, 2003, the entire disclosure of which is hereby incorporated by reference.

FIELD OF THE INVENTION

The invention relates to a license plate frame. More particularly, the invention relates to a license plate frame having a flexible, multi-layer molded decorative component and optionally, a semi-rigid stabilizer component.

BACKGROUND OF THE INVENTION

License plate frames or holders are available in a wide variety of designs made from a wide variety of materials. For example, protective frames are available in which a transparent cover protects the license plate from dirt, grease, and other contaminants while yet permitting the license plate number to be viewed. Such frames generally employ a metal or rigid plastic frame. Existing license plate holders include those made of a single component overlying or wrapping around the edges of the license plate and multi-component structures having back and front portions which completely encapsulate the license plate. Of course, as the structure becomes increasingly complex, cost and difficulty of installation also generally increase.

Along with vanity license plates, decorative license plate frames or holders are popular amongst car enthusiasts as well as those wishing to make a statement or to have a decorative element on their vehicle. Because of the nature of the product, however, consumers are generally willing to spend only a nominal amount. Currently, there are available a number of decorative license plate frames on which stock and/or customized lettering and designs may be placed. For example, rigid or semi-rigid plastic strips having engraved lettering may be adhered onto the face surface of a metal license plate frame. Alternatively, lettering may be engraved into a sufficiently rigid license plate frame. Stamped metal license plate frames having one or more epoxy color coatings are also available. Each of these existing types of license plate frames, however, have limited decorative flexibility with the engraved and/or stamped designs being fairly simple and having one or few colors for manufacturing ease as well as reasonable cost of production.

There remains a need therefore for an economical license plate frame having great design flexibility.

SUMMARY OF THE INVENTION

The license plate frame of the invention meets these and other needs. The invention provides a decorative component which is produced by multi-injection or compression molding and which may include three-dimensional and multi-color decorative elements. According to the invention, the decorative component may be used individually or may be used in combination with a rigid or semi-rigid plastic stabilizer component.

The method of manufacturing the license plate frame includes multi-injection or compression molding of the decorative component according to a custom or stock design. In an alternative embodiment, the method further includes formation of the backing component and adhesion of the decorative component to the backing component.

DESCRIPTION OF EMBODIMENTS OF THE INVENTION

Figure 1:
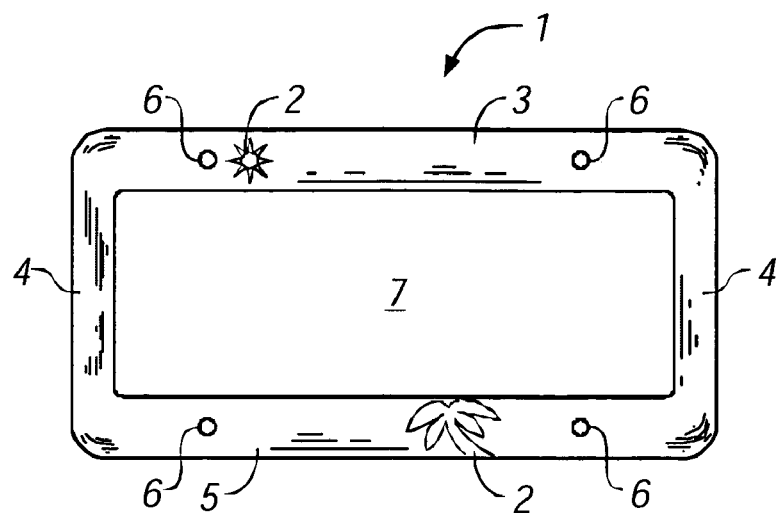
FIG. 1 is a plan front view of the flexible decorative component.

The license plate frame comprises a thin molded substantially flexible decorative component. Referring to FIG. 1, a plan front view of an embodiment of the decorative component 1 is shown. Any of a number of design elements 2, including, for example, letters, symbols and shapes, may be depicted on the face of the decorative component. The design elements may have a variety of colors. The shape of the decorative component is shown as a rectangular frame, having an upper rail portion 3, side rail portions 4 and a bottom rail portion 5. Upper rail portion 3 and/or bottom rail portion 5 may have one or more openings 6, of substantially the same size and located so as to correspond to the standard location of fasteners used to attach license plates to a vehicle. Generally, the license plate frame will have a total of two or more openings 6 to securely fasten the frame and license to the vehicle. The upper rail portion 3, side rail portions 4 and bottom rail portion 5 circumscribe an opening 7 which is of a size and shape such that the face of a license plate placed behind the decorative component 1 substantially shows through opening 7.

Figure 4:
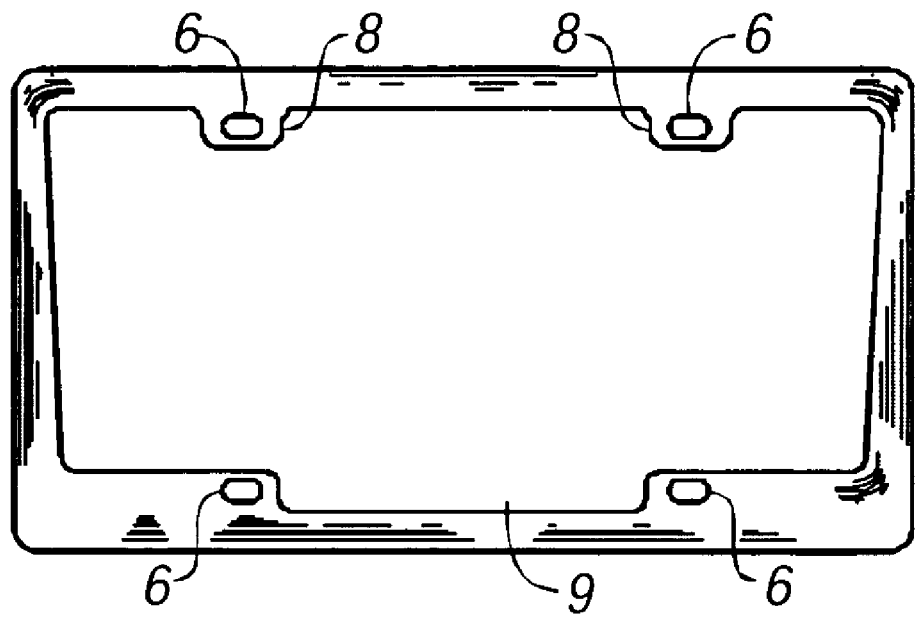
FIG. 4 is a plan view of an alternative embodiment of the license plate frame.

Alternative decorative component shapes may likewise be used in lieu of a rectangular shape so long as the frame shape includes an opening through which the relevant portion of a license plate may be seen when the decorative component is substantially centered over the license plate. Such alternative shapes may include, for example, unequal-sided hexagonal, pentagonal, octagonal, and oval and irregular or abstract. Likewise, the opening 7 may have any shape including, for example, rectangular, ovoid, or abstract. Moreover, the frame shapes may have inwardly protruding tabs or cutout sections. For example, FIG. 4 depicts a rectangular frame shape having an inwardly protruding tab 8 and a cutout section 9.

Figure 2:
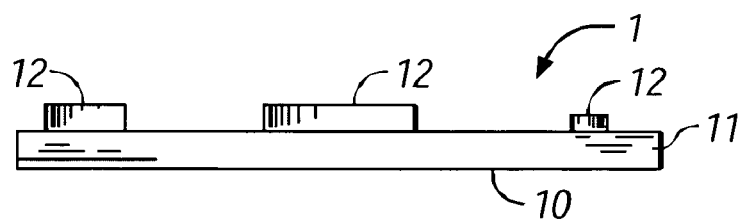
FIG. 2 is a partial, expanded side view of a bottom edge of the flexible decorative component.

Referring to FIG. 2, a side view of a bottom rail portion 5 of the decorative component 1 is shown. A bottom surface 10 is substantially flat. Further as shown in FIG. 2, the decorative elements may have varying depths relative to the plane defined by bottom surface 2. As shown in FIG. 2, the decorative component 1 includes a backing layer 11 and relief layers 12. Although shown as having substantially equal height in FIG. 2, relief layers 12 may have two or more differing heights, as desired to achieve a three-dimensional decorative effect. In addition, each of backing layer 11 and relief layers 12 may be of the same or different colors. Referring again to FIG. 1, each of decorative elements 2 is formed by a relief layer 12.

The thickness of backing layer 11 and relief layer 12 may each vary and are limited primarily by considerations of manufacturing ease, cost and usage. Backing layer 11 generally has a thickness of between about 1/16 inch to about 1/2 inch, or alternatively, between about 1/16 inch to about 1/4 inch. That portion of relief layer 12 which extends beyond backing layer 11 generally range in thickness from about 1/64 inch to about 1/2 inch, or alternatively, from about 1/64 inch to about 1/16 inch.

Backing layer 11 and relief layer 12 may be produced of the same or different polymeric compositions. The polymeric compositions of backing layer 11 and relief layer 12 are generally chosen to be compatible so as to prevent delamination. The polymeric compositions of backing layer 11 and relief layer 12 may be either thermoplastic or thermoset resins and are generally selected for non-tackiness, flexibility, coloring ability and weatherability. Suitable polymers include unsaturated polyesters, polyvinylchloride (PVC), polyesters and polyolefins. Suitable polyolefins can include a low density polyethylene (LDPE), a very low density polyethylene (VLDPE), a linear low density polyethylene (LLDPE), polyethylene (e.g., PE, LDPE, or VLDPE), a polypropylene, an ethylene-propylene diene monomer (EPDM) copolymer, an ethylene-propylene rubber (EPR), a polystyrene, a styrene copolymer, an ethylene-styrene interpolymer, a polyacrylonitrile, a polybutadiene, a polyvinylchloride (PVC), a polyvinylidene chloride, a polyvinylfluoride, a polyvinylidene fluoride, a polyvinyl acetate, a polyvinyl alcohol, a polyamide, a polyacrylate (e.g., a polymethyl acrylate or a polymethyl methacrylate), a polychlorotrifluoroethylene, a polytetrafluoroethylene, a cellulose, a polyester, a polyhalocarbon, and copolymers of ethylene with propylene, isobutene, butene, hexene, octene, vinyl chloride, vinyl propionate, vinyl isobutyrate, vinyl alcohol, allyl alcohol, allyl acetate, allyl acetone, allyl benzene, allyl ether, maleic anhydride, ethyl acrylate (EEA), methyl acrylate, acrylic acid, or methacrylic acid and blends thereof.

Alternatively, co-polymer compositions having thee desired properties may be used as material of construction of backing layer 11 and relief layer 12. For example, ethylene-vinylacetate (EVA) copolymers having a maleic anhydride grafted component are known to be capable of processing as other thermoplastics but possess a rubbery, flexible, and non-tacky character. Acceptable EVA copolymers can have a vinyl acetate content of between about 9 and 60 percent vinyl acetate. Preferably, the vinyl acetate content of the ethylene vinyl acetate copolymer is between 15 and 50 percent. Suitable EVA copolymers can have vinyl acetate (VA) contents of 9 percent, 17 percent, 23 percent, 28 percent, or 40 percent. Commercially available EVA copolymers include AT Polymers 1070C (9% VA), AT Polymers 1710 (17% VA), AT Polymers 2306 (23% VA), AT Polymers 2803 (28% VA), AT Polymers 2810 (28% VA), Chevron/Ace Plastics TD 3401 (9.5% VA), Chevron/Ace Plastics DS 4089-70 (18% VA), DuPont Elvax 40 (40% VA), DuPont Elvax 140-W (33% VA), DuPont Elvax 250-W (28% VA), DuPont Elvax 260 (28% VA), DuPont Elvax 350 (25% VA), DuPont Elvax 360 (25% VA), DuPont Elvax 450 (18% VA), DuPont Elvax 460 (18% VA), DuPont Elvax 550 (15% VA), DuPont Elvax 560 (15% VA), DuPont Elvax 650 (12% VA), DuPont Elvax 660 (12% VA), DuPont Elvax 750 (9% VA), DuPont Elvax 760 (9.3% VA), DuPont Elvax 770 (9.5% VA), Exxon Escorene LD-740 (24.5% VA), Exxon Escorene LD-724 (18% VA), Exxon Escorene LD-721.62 (19.3% VA), Exxon Escorene LD-721.88 (19.3% VA), Exxon Escorene LD-721 (19.3% VA), Exxon Escorene LD-740 (24.5% VA), Exxon Escorene LD-318 (9% VA), Exxon Escorene LD-319.92 (9% VA), Exxon Escorene LD-725, Quantum UE 630-000 (17% VA), Quantum 637-000 (9% VA), Rexene X1903 (10% VA), Rexene X0901 (12% VA), Rexene X0911 (18% VA), and Rexene X0915 (9% VA).

Colorants may be added to any or all of the backing layer 11 and relief layer 12. Colorants suitable for polymeric compositions are readily apparent to those skilled in the art. By way of example, colorants useful in the invention include organic pigments, inorganic pigments, and metallic flakes or powders. Suitable colorants may be used in combination with dispersants, a number of which are well known in the art.

The decorative component 1 may be formed by either injection or compression molding. Both such techniques and the manner of molding multi-layered polymeric articles are well known in the art. In the case of injection molding, a multiple nozzle technique would be most efficacious so as to form multiple colored relief layers. In the case of compression molding, relatively low volume syringes, on the order of between about 1 cc to about 100 cc, may be used to inject polymer into mold components corresponding to relief layers whereas a larger volume syringe may be used to inject polymer corresponding to a backing layer. Methods and apparatus useful in forming the decorative component are disclosed, for example and not limitation, in U.S. Pat. Nos. 6,196,825; 5,698,240; 5,026,265; 6,332,767; and 3,988,401.

Figure 3:
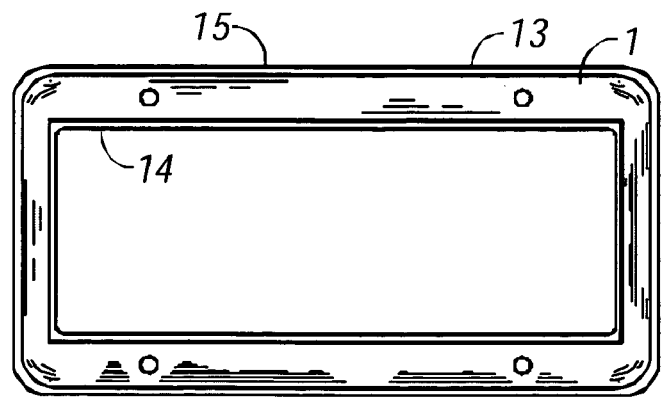
FIG. 3 is a plan front view of a license plate frame having a flexible decorative component and a stabilizer component.

In another embodiment of the invention, decorative component 1 is placed within a rigid or semi-rigid stabilizer component. Referring to FIG. 3, a plan front view is shown of the license plate frame having a stabilizer component 13 onto which a decorative component 1 has been attached. As seen in FIG. 3, stabilizer component 13 is substantially the same shape as decorative component 1 but is slightly larger such that inner 14 and outer 15 edges of stabilizer component 13 extend beyond the edges of the decorative component 1. Alternatively, stabilizer component 13 may be of identical size and shape as decorative component 1.

Figure 5:
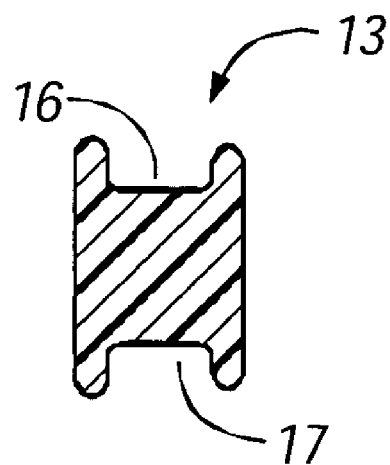
FIG. 5 illustrates a cross section of a stabilizer component.

Stabilizer component 13 may have a substantially flat shape. Alternatively, stabilizer component 13 may have a front recessed portion on a front face such that a decorative component may be attached within such front recessed portion. As yet another alternative embodiment, stabilizer component 13 may have a back recessed portion on a back face such that a license plate may fit within such back recessed portion. FIG. 5 illustrates a cross section of stabilizer component 13 having both a front recessed portion 16 and a back recessed portion 17.

Stabilizer component 13 is constructed of rigid or semi-rigid plastic. Suitable materials of construction of stabilizer component 13 include, for example, terpolymers of acrylonitrile-butadiene-styrene (ABS), high-density polyethylene, acrylates, polyamides, and polystyrene. Material of construction of the stabilizer component 13 are chosen based upon properties of rigidity, hardness (but not brittleness), good impact strength, good high and low temperature properties, weatherability and chemical resistance. A number of polymeric materials possessing such properties are well known in the art and would be readily apparent to one of ordinary skill in the art.

Aspects and advantages of the invention are further illustrated by reference to the following example:

EXAMPLE 1

PVC powder is mixed with an appropriate quantity of DINP oil to form a flowable, injectable PVC liquid. The PVC liquid was pigmented by addition of an effective amount of powder pigment thereby forming a pigmented PVC having a cream consistency. Beginning with the outermost relief layer, the pigmented PVC is injected into the relevant portions of a mold. Following each PVC injection, the mold was heated to 180° C. for 1 minute. When all the relief layers had been injected and heated, PVC liquid was injected to fill the remaining mold spaces and to form the backing layer. Following this final PVC liquid injection, the mold was again heated to 180° C. for 1 minute. The mold was then cooled in a cold water bath at about 5° C. for a period of time sufficient to permit the PVC to become firm. The decorative component was then removed from the mold and glued onto a pre-formed ABS stabilizer component.

What is claimed is:

1. A license plate frame comprising:
    a decorative component having a frame shape and comprising a backing layer and one or more relief layers laminated onto the backing layer, wherein the decorative component is made of a flexible polymeric material;
    a stabilizer component having a frame shape and a front face substantially of the same shape as the decorative component and comprising a rigid or semi-rigid plastic material;
    wherein the decorative component is attached to the front face of the stabilizer component and wherein the stabilizer component is slightly larger than the decorative component.

2. A license plate frame comprising:
    a decorative component having a frame shape and comprising a backing layer and one or more relief layers laminated onto the backing layer, wherein the decorative component is made of a flexible polymeric material;
    a stabilizer component having a frame shape and a front face substantially of the same shape as the decorative component and comprising a rigid or semi-rigid plastic material;
    wherein the decorative component is attached to the front face of the stabilizer component and wherein the stabilizer component is slightly larger than the decorative component such that inner and outer edges of the stabilizer component extend beyond the edges of the decorative component.

3. A license plate frame comprising:
    a decorative component having a frame shape and comprising a backing layer and one or more relief layers laminated onto the backing layer, wherein the decorative component is made of a flexible polymeric material;
    a stabilizer component having a frame shape and a front face substantially of the same shape as the decorative component and comprising a rigid or semi-rigid plastic material;
    wherein the decorative component is attached to the front face of the stabilizer component and wherein the stabilizer component is of identical size and shape as the decorative component.

4. A license plate frame comprising:
    a decorative component having a frame shape and comprising a backing layer and one or more relief layers laminated onto the backing layer, wherein the decorative component is made of a flexible polymeric material;
    a stabilizer component having a frame shape and a front face substantially of the same shape as the decorative component and comprising a rigid or semi-rigid plastic material;
    wherein the decorative component is attached to the front face of the stabilizer component and wherein the stabilizer component comprises a front recessed portion on the front face such that the decorative component can be attached within the front recessed portion.

5. A license plate frame comprising:
    a decorative component having a frame shape and comprising a backing layer and one or more relief layers laminated onto the backing layer, wherein the decorative component is made of a flexible polymeric material;
    a stabilizer component having a frame shape and a front face substantially of the same shape as the decorative component and comprising a rigid or semi-rigid plastic material;
    wherein the decorative component is attached to the front face of the stabilizer component and wherein the stabilizer component comprises a back recessed portion on a back face such that a license plate can fit within the back recessed portion.

6. A license plate frame comprising:
    a decorative component having a frame shape and comprising a backing layer and one or more relief layers laminated onto the backing layer, wherein the decorative component is made of a flexible polymeric material;
    a stabilizer component having a frame shape and a front face substantially of the same shape as the decorative component and comprising a rigid or semi-rigid plastic material;
    wherein the decorative component is attached to the front face of the stabilizer component and wherein the stabilizer component comprises a front recessed portion on the front face such that the decorative component can be attached within the front recessed portion and further wherein the stabilizer component comprises a back recessed portion on a back face such that a license plate can fit within the back recessed portion.

* * * * *